US012697956B2

(12) United States Patent
Fu et al.

(10) Patent No.: US 12,697,956 B2
(45) Date of Patent: Aug. 4, 2026

(54) ANTI-CARSICKNESS ACTIVE SUSPENSION ROBUST GENETIC CONTROL METHOD

(71) Applicant: Zhengzhou University of Light Industry, Zhengzhou (CN)

(72) Inventors: Zhijun Fu, Zhengzhou (CN); Minghui Cui, Zhengzhou (CN); Huanjun Zhang, Zhengzhou (CN); Dengfeng Zhao, Zhengzhou (CN); Yuanwei Li, Zhengzhou (CN); Sheng Li, Zhengzhou (CN); Qu Zhao, Zhengzhou (CN); Zhigang Zhang, Zhengzhou (CN); Yaohua Guo, Zhengzhou (CN); Jinquan Ding, Zhengzhou (CN); Wenbin He, Zhengzhou (CN); Junjian Hou, Zhengzhou (CN); Changjun Wu, Zhengzhou (CN); Yuming Yin, Zhengzhou (CN)

(73) Assignee: Zhengzhou University of Light Industry, Zhengzhou (CN)

( * ) Notice: Subject to any disclaimer, the term of this patent is extended or adjusted under 35 U.S.C. 154(b) by 0 days.

(21) Appl. No.: 19/190,857

(22) Filed: Apr. 28, 2025

(65) Prior Publication Data

US 2025/0333043 A1 Oct. 30, 2025

(30) Foreign Application Priority Data

Apr. 28, 2024 (CN) .......................... 202420518161.3

(51) Int. Cl.
*B60W 10/22* (2006.01)
*B60W 30/02* (2012.01)
(Continued)

(52) U.S. Cl.
CPC .......... *B60W 10/22* (2013.01); *B60W 30/025* (2013.01); *B60W 50/00* (2013.01); *G06N 3/086* (2013.01); *B60W 2050/0008* (2013.01)

(58) Field of Classification Search
CPC .... B60W 10/22; B60W 30/025; B60W 50/00; B60W 2050/0008; G06N 3/086
See application file for complete search history.

(56) References Cited

U.S. PATENT DOCUMENTS

| | | | | |
|---|---|---|---|---|
| 2014/0181828 A1* | 6/2014 | Bird | ...................... | G06F 9/5066 |
| | | | | 718/103 |
| 2017/0136842 A1* | 5/2017 | Anderson | ............ | B60G 17/016 |

(Continued)

*Primary Examiner* — Adnan M Mirza

(57) ABSTRACT

An anti-carsickness active suspension robust genetic control method, which establishes a vehicle four-degree-of-freedom suspension model considering wheelbase preview, and the suspension designed by the disclosure meets the constraint conditions that the dynamic stroke does not exceed the maximum allowable stroke, the wheels keep good contact with the ground, the control force should be smaller than the maximum output control force of an actuator, and the like. Meanwhile, an objective function for preventing carsickness of a driver and passengers is established, a state output feedback control gain is solved based on a linear matrix inequality method, and a finite frequency domain robust control method optimized through a genetic algorithm is designed, so that optimal parameters of robust control are obtained. The control performance of the active suspension on road excitation in the motion sickness frequency interval is the best, and the riding comfort and the vehicle driving smoothness are improved.

7 Claims, 2 Drawing Sheets

(51) Int. Cl.
    *B60W 50/00*        (2006.01)
    *G06N 3/086*       (2023.01)

(56)           References Cited

U.S. PATENT DOCUMENTS

2023/0123469 A1*   4/2023   Di Cairano .......... B62D 15/021
                                        701/70
2023/0141330 A1*   5/2023   Konada ............. B60G 17/0165
                                      280/5.514

* cited by examiner

ANTI-CARSICKNESS ACTIVE SUSPENSION ROBUST GENETIC CONTROL METHOD

CROSS-REFERENCE TO RELATED APPLICATIONS

This application claims priority to Chinese patent application No. 202410518161.3 filed on Apr. 28, 2024, entitled "Anti-carsickness active suspension robust genetic control method", the entire contents of which are incorporated herein by reference.

TECHNICAL FIELD

The present disclosure relates to the technical field of vehicle suspension control, and in particular to an active suspension robust genetic control method for preventing motion sickness.

BACKGROUND

Vehicle suspension system is an important component of a vehicle. The performance of the suspension directly affects the smoothness of the vehicle's ride and the riding comfort of passengers and drivers, and has a great impact on the occupants' motion sickness.

Due to the existence of resonance, human body will suffer from motion sickness when exposed to vertical and pitch vibrations. However, most of the previous suspension models used two-degree-of-freedom models, which could only respond to vertical vibrations but cannot effectively respond to pitch vibrations. Therefore, it is necessary to establish a four-degree-of-freedom vehicle model to effectively respond to the vertical and pitch motions of the vehicle and to perform inter-axis preview, thereby improving the performance of the active suspension and improving ride comfort.

To meet the requirements, it is necessary to design an active suspension control strategy that can effectively suppress the vibration of the suspension in the frequency range (0.1-0.5 Hz) where passengers are prone to motion sickness, while ensuring the basic performance of the suspension. The robust H∞ control method can effectively handle these constraints. Control strategy for the frequency range where motion sickness is prone to occur is not considered in previous active suspensions. The control parameters rely on experience to debug and determine the values of each parameter, making it difficult to find the optimal solution.

Genetic algorithms are designed based on the laws of biological evolution in nature. They optimize control parameters by simulating the natural evolution process to search for the optimal solution. Genetic algorithms can quickly obtain more complex combination optimization solutions through "selection, crossover, and mutation."

Since different combinations of control parameter values will have a significant impact on the controller solution, a genetic algorithm with strong global optimization and parallel search capabilities to improve the control algorithm is introduced, which provides a feasible solution for finding the optimal solution of the controller. Previous active suspension control algorithms did not use genetic algorithms to optimize their control parameters.

In summary, it is necessary to provide a robust genetic control method for active suspension to prevent motion sickness.

SUMMARY

To solve the above technical problems, the present disclosure provides an anti-carsickness active suspension robust genetic control method, which uses a genetic algorithm to adjust the control parameters to obtain a final solution that satisfies the objective function, thereby achieving the purpose of reducing the incidence of motion sickness.

To achieve the above object, the present disclosure provides an anti-carsickness active suspension robust genetic control method, comprising the following steps:

S1: Establishing a system state equation of a vehicle's four-degree-of-freedom active suspension according to dynamic characteristics of the vehicle;

S2: Establishing basic performance constraints of the suspension and an optimization objective function for anti-carsickness, so as to obtain a control state equation;

S3: During vehicle driving, establishing an active suspension robust control state equation having a wheelbase preview according to road information collected by front wheels and constraints like motion sickness index;

S4: Based on the state equation obtained in S3, designing a finite frequency domain H∞ control algorithm for controlling an input delay, and establishing a linear matrix inequality for a system stability;

S5: Introducing a genetic algorithm to find an optimal solution for parameters in the linear matrix inequality, and improving the control algorithm is by the genetic algorithm to find an optimal solution of a controller;

S6: Based on the optimal solution obtained in S5, obtaining a closed-loop control system that satisfies the constraints of the suspension and the optimization objective function for anti-carsickness, so as to obtain a feedback gain of an output state, and further obtain the controller of the active suspension.

Furthermore, S1 is specifically:

The differential equation of motion for the system is as follows:

$$m_c\ddot{x}_c + c_{sf}(\dot{x}_{sf} - \dot{x}_{tf}) + k_{sf}(x_{sf} - x_{tf}) +$$
$$c_{sr}(\dot{x}_{sr} - \dot{x}_{tr}) + k_{sr}(x_{sr} - x_{tr}) + F_{af} + F_{ar} = 0$$

$$I_c\ddot{\theta}_c - ac_{sf}(\dot{x}_{sf} - \dot{x}_{tf}) - ak_{sf}(x_{sf} - x_{tf}) +$$
$$bc_{sr}(\dot{x}_{sr} - \dot{x}_{tr}) + bk_{sr}(x_{sr} - x_{tr}) - aF_{af} + bF_{ar} = 0$$

$$m_{tf}\ddot{x}_{tf} - c_{sf}(\dot{x}_{sf} - \dot{x}_{tf}) - k_{sf}(x_{sf} - x_{tf}) + k_{tf}(x_{tf} - x_{rf}) - F_{af} = 0$$

$$m_{tr}\ddot{x}_{tr} - c_{sr}(\dot{x}_{sr} - \dot{x}_{tr}) - k_{sr}(x_{sr} - x_{tr}) + k_{tr}(x_{tr} - x_{rr}) - F_{ar} = 0$$

Among them: $m_c$ is the over-sprung mass, $m_{tf}$ is the under-sprung mass of the front wheel, $m_{tr}$ is the under-sprung mass of the rear wheel, $I_c$ is the moment inertia of the body, $\theta_c$ is the pitch angle of the body, $x_c$ is the vertical displacement of the gravity center of the body, $x_{tf}$ is the vertical displacement of the front wheel, $x_{tr}$ is the vertical displacement of the rear wheel, $x_{rf}$ is the front wheel road input, $x_{rr}$ is the rear wheel road input, $c_{sf}$ is the front suspension damping, $c_{sr}$ is the rear suspension damping, $k_{sf}$ is the front suspension stiffness, $k_{sr}$ is the rear suspension stiffness, $k_{tf}$ is the front tire stiffness, $k_{tr}$ is the rear tire stiffness, $F_{af}$ is the front suspension actuator output force, $F_{ar}$ is the rear suspension actuator output force, a is the front wheelbase, and b is the rear wheelbase; $\Box$ denotes the first-order derivative of the quantity, i.e., velocity, and $\ddot{\Box}$ denotes the second-order derivative of the quantity, i.e., acceleration.

The state vector is selected as:

$$X = [x_{sf}, x_{tf}, x_{sr}, x_{tr}, \dot{x}_{sf}, \dot{x}_{tf}, \dot{x}_{sr}, \dot{x}_{tr}]^T$$

The differential equation of motion of the active suspension system is converted into the system state equation:

$$\dot{X} = AX + BU + \Gamma W$$

Among them:

$$A = \begin{bmatrix} A_{11} & A_{12} \\ A_{21} & A_{22} \end{bmatrix}; B = \begin{bmatrix} B_1 \\ B_2 \end{bmatrix}; U = \begin{bmatrix} F_{af} \\ F_{ar} \end{bmatrix}; \Gamma = \begin{bmatrix} \Gamma_1 \\ \Gamma_2 \end{bmatrix}; W = \begin{bmatrix} x_{rf} \\ x_{rr} \end{bmatrix}$$

Let $k_1 = I_c + a^2 m_c$, $k_2 = I_c + b^2 m_c$, $k_3 = I_c - abm_c$, $k_4 = I_c m_c$, then:

$$A_{11} = \begin{bmatrix} 0 & 0 & 0 & 0 \\ 0 & 0 & 0 & 0 \\ 0 & 0 & 0 & 0 \\ 0 & 0 & 0 & 0 \end{bmatrix}; A_{12} = \begin{bmatrix} 1 & 0 & 0 & 0 \\ 0 & 1 & 0 & 0 \\ 0 & 0 & 1 & 0 \\ 0 & 0 & 0 & 1 \end{bmatrix};$$

$$A_{21} = \begin{bmatrix} -\dfrac{k_1}{k_4}k_{sf} & \dfrac{k_1}{k_4}k_{sf} & -\dfrac{k_3}{k_4}k_{sr} & \dfrac{k_3}{k_4}k_{sr} \\ \dfrac{k_{sf}}{m_{tf}} & -\dfrac{k_{sf}+k_{tf}}{m_{tf}} & 0 & 0 \\ -\dfrac{k_3}{k_4}k_{sf} & \dfrac{k_3}{k_4}k_{sf} & -\dfrac{k_2}{k_4}k_{sr} & \dfrac{k_2}{k_4}k_{sr} \\ 0 & 0 & \dfrac{k_{sr}}{m_{tr}} & -\dfrac{k_{sr}+k_{tr}}{m_{tr}} \end{bmatrix};$$

$$A_{22} = \begin{bmatrix} -\dfrac{k_1}{k_4}c_{sf} & \dfrac{k_1}{k_4}c_{sf} & -\dfrac{k_3}{k_4}c_{sr} & \dfrac{k_3}{k_4}c_{sr} \\ \dfrac{c_{sf}}{m_{tf}} & -\dfrac{c_{sf}}{m_{tf}} & 0 & 0 \\ -\dfrac{k_3}{k_4}c_{sf} & \dfrac{k_3}{k_4}c_{sf} & -\dfrac{k_2}{k_4}c_{sr} & \dfrac{k_2}{k_4}c_{sr} \\ 0 & 0 & \dfrac{c_{sr}}{m_{tr}} & -\dfrac{c_{sr}}{m_{tr}} \end{bmatrix}; B_1 = \begin{bmatrix} 0 & 0 & 0 & 0 \\ 0 & 0 & 0 & 0 \end{bmatrix}^T;$$

$$B_2 = \begin{bmatrix} -\dfrac{k_1}{k_4} & \dfrac{1}{m_{tf}} & -\dfrac{k_3}{k_4} & 0 \\ -\dfrac{k_3}{k_4} & 0 & -\dfrac{k_2}{k_4} & \dfrac{1}{m_{tf}} \end{bmatrix}^T;$$

$$\Gamma_1 = \begin{bmatrix} 0 & 0 & 0 & 0 \\ 0 & 0 & 0 & 0 \end{bmatrix}^T; \Gamma_2 = \begin{bmatrix} 0 & \dfrac{k_{tf}}{m_{tf}} & 0 & 0 \\ 0 & 0 & 0 & \dfrac{k_{tr}}{m_{tr}} \end{bmatrix}^T.$$

Furthermore, S2 is specifically:

S2.1 Establishing the basic performance constraints of the suspension, that is, satisfying the following conditions:

1) a travel of the suspension should not exceed a maximum allowable travel, that is, $|x_t - x_s| < x_{stmax}$; among them, $x_t$ represents the vertical displacement of the tire, $x_s$ represents the vertical displacement of the vehicle body, and $x_{stmax}$ represents the maximum allowable travel of the suspension;

2) the wheels maintain good contact with the ground, that is, $|k_t(x_r - x_t)| < |(m_c + m_t)g|$; among them, $k_t$ represents tire stiffness, $x_r$ represents vertical displacement of the road surface, $m_t$ represents tire mass, and $g$ represents gravity acceleration;

3) a control force should be less than a maximum output control force of the actuator, that is, $F_a < F_{max}$; among them, $F_a$ represents the actuator output force, and $F_{max}$ represents the maximum output force of the actuator. A control output of a selectable system is:

$$Z_2 = \left[ \frac{x_t - x_s}{x_{st\,max}} \quad \frac{k_t(x_r - x_t)}{(m_c + m_t)g} \quad \frac{F_a}{F_{max}} \right]^T;$$

S2.2 Establishing an optimization objective function for anti-carsickness:

$$\sup_{0.1 < \omega < 0.5} \left\| G_{\omega z_1}(j\omega) \right\|_\infty < \gamma.$$

Establish the best suspension suppression capability for road excitation within the motion sickness frequency range, which can effectively alleviate occupants' motion sickness, and improve ride comfort and vehicle driving smoothness. The road disturbance input is an energy-bounded signal. The control goal of this control method is to improve the ride comfort and reduce the vehicle acceleration and the vehicle pitch angle acceleration. Therefore, an observation output of the selectable system is $Z_1 = [\ddot{x}_{sf} \ \ddot{\theta}_c \ \ddot{x}_{sr}]^T$, which can be achieved by reducing the maximum value of the transfer function from the road disturbance to the vehicle acceleration. The mathematical description of the control goal is $$\sup_{0.1 < \omega < 0.5} \left\| G_{\omega z_1}(j\omega) \right\|_\infty < \gamma.$$

Furthermore, S3 is specifically:

Since the wheelbase L of the vehicle is a constant, there is a time lag between the front wheel excitation and the rear wheel excitation of the four-degree-of-freedom suspension model, that is $$t_\tau = \frac{L}{v_c},$$

where $t_\tau$ represents the excitation input time lag, and $v_c$ represents the vehicle speed. Therefore, the control state equation is:

$$\dot{X} = AX + BU + \Gamma W$$
$$Z_1 = C_1 X + D_1 U$$
$$Z_2 = C_2 X + D_2 U$$

Among them, $C_1$ and $D_1$ are the coefficient matrices of the observation output, and $C_2$ and $D_2$ are the coefficient matrices of the control output.

Furthermore, S4 is specifically:

For given positive numbers $\gamma$, $\alpha$, $\beta_1$, $\beta_2$, $\rho$, if there exist symmetric matrices $P>0$, $P_1>0$, $P_2>0$, $S_1>0$, $S_2>0$, $R_1>0$, $R_2>0$, $Q>0$, and arbitrary matrices K and Y satisfy the inequality:

$$\begin{bmatrix} t_\tau^2 S_1 - [Y]_s & P_1 + AY^T - \alpha Y & BK \\ * & R_1 - S_1 + \alpha[AY^T]_s & S_1 + \alpha BK \\ * & * & -R_1 - S_1 \end{bmatrix} < 0$$

$$\begin{bmatrix} \prod_1 & \prod_2 & \beta_1 BK & \beta_1 D & O \\ * & \prod_3 & \beta_2 BK & \beta_2 D & YC_1^T \\ * & * & -R_2 - S_2 & O & K^T D_1^T \\ * & * & * & -\gamma^2 I & 0 \\ * & * & * & * & -I \end{bmatrix} < 0$$

$$\begin{bmatrix} -I/\rho & \{C_2 + D_2 K\}_i \\ * & -P_2 \end{bmatrix} < 0$$

wherein, the symbol $[\square]_s$ is the sum of a matrix "$\square$" and its transposed matrix; $*$ is the transpose of its diagonal symmetric elements; $\{\square\}_i$ represents the i-th row of the matrix "$\square$";

$$\prod_1 = t_\tau^2 S_2 - Q - \beta_1[Y];$$

$$\prod_2 = P + P_2 + j\omega_c Q + \beta_1 AY^T - \beta_2 Y;$$

$$\prod_3 = R_2 - S_2 - \omega_1\omega_2 Q + \beta_2[AY^T]_s.$$

Furthermore, S5 is specifically:

S5.1 Encoding chromosome and generating population. Chromosome coding is real number coding with control parameters as adjustable variables for chromosomes, which can be expressed as Ch=($\alpha$, $\beta$1, $\beta$2). Feasible population is adopted in the creation of the initial trial population, and a random initial population can be created while satisfying boundary conditions and constraints, thereby ensuring the diversity of the initial population and the global search of the algorithm.

S5.2 Selecting a fitness function and scaling a fitness value. An optimization goal of the controller is to find the control parameter value that makes $\gamma$ have the minimum value, so as to minimize the H$\infty$ norm of the transfer function from road disturbance to vehicle acceleration, especially to minimize the influence within the frequency range where human body is prone to motion sickness. In the GA toolbox in MATLAB, the fitness function uses the minimization objective function, and the fitness function can be directly taken as Fitness=$\gamma$(Ch).

S5.3 Introducing selection, crossover, mutation and migration operators. The selection operator means randomly selecting n chromosomes according to the fitness value, and the best individuals among the n chromosomes being used as parents to generate individuals of the next generation. The crossover operator means selecting a pair of individuals from the parent individuals, generating new individuals through crossover operation, and mixing the chromosome information of the two individuals. The mutation operator means performing mutation operation on the newly generated individuals and introducing randomness, so as to increase the diversity of the search space. The migration operator is an advanced genetic operator that supports the exchange of individuals in multiple sub-populations, the worst individual in a sub-population is replaced by the best individual in another sub-population. Compared with the single-population genetic algorithm, the genetic algorithm for individual migration in multiple sub-populations can improve the optimization performance of the algorithm. Migration can only be from the n-generation sub-population to the (n+1)-generation sub-population. The migration rate is 0.1 and the migration interval is 10, that is, migration once every 10 generations.

S5.4 Judging a termination condition. A number of iterations is adopted in the termination criterion of the genetic algorithm, that is, when the maximum number of iterations is reached or the objective function reaches a certain threshold, it is judged whether the algorithm stops.

Furthermore, S6 is specifically:

Taking the suspension time-delay system as the research object, the design process of the finite frequency domain H$\infty$ controller for controlling input time delay can be obtained as follows:

(1) The system gradually stabilizes when there is no external interference;

(2) Under zero initial conditions, the transfer function from external disturbance to output should satisfy the following conditions within the passenger motion sickness frequency range (0.1-0.5 Hz):

$$\sup_{0.1 < \omega < 0.5} \left\| G_{\omega z_1}(j\omega) \right\|_\infty < \gamma;$$

(3) When the external disturbance energy is less than $\omega_{max} = \sqrt{\rho/\gamma}$, the control constraints can always be guaranteed.

After the main control parameters $\alpha$, $\beta$1, $\beta$2 are obtained through genetic algorithm optimization, the linear matrix inequality is solved, and then the feedback gain of the controller is obtained through state feedback control, and then the control force of the actuator is obtained.

Compared with the prior art, the active suspension robust genetic control method for preventing motion sickness described in the present disclosure has the following advantages:

(1) By considering the frequency of motion sickness of passengers and taking it as the constraint condition of the active suspension, a finite frequency domain state feedback robust control algorithm is designed to avoid the vibration in the 0.1-0.5 Hz frequency band that has a greater impact on motion sickness of passengers, thereby improving ride comfort and preventing passengers from motion sickness.

(2) The present disclosure uses a robust H$\infty$ control algorithm to control the vehicle's four-degree-of-freedom active suspension model, which can effectively ensure the various performance requirements of the vehicle suspension;

(3) The present disclosure also considers the wheelbase preview of the vehicle, the road surface excitation passed by the front wheels of the vehicle, and the rear wheels will pass through the same road surface excitation as the front wheels after a certain time lag t$\tau$. The four-degree-of-freedom suspension model is used to further improve the performance of the suspension.

(4) The present disclosure also uses a genetic algorithm to optimize and solve the linear matrix inequality in the robust control algorithm to obtain the optimal parameters. Compared with simply relying on experience to debug and determine the values of each parameter, the genetic algorithm is used to improve the design of the control algorithm, further improve the control purpose of anti-carsickness, and enhance ride comfort.

BRIEF DESCRIPTION OF DRAWINGS

To more clearly illustrate the technical solutions in the present disclosure or prior art, a brief description of the accompanying drawing to be used in the description of the embodiments or prior art will be given below. The drawing described below is obviously just an embodiment of the present disclosure. For ordinary technicians in this field, other drawings can be obtained based on the drawing without doing creative work.

DESCRIPTION OF EMBODIMENTS

The technical solutions in the embodiments of the present disclosure are clearly and completely described below in combination with the specific contents of the present disclosure. Obviously, the described embodiments are only a part of the embodiments of the present disclosure, rather than all the embodiments. Based on the embodiments of the present disclosure, all other embodiments obtained by ordinary technicians in the field without making any creative work shall fall within the protection scope of the present disclosure. The contents not described in detail in the embodiments of the present disclosure belong to the prior art known to professional and technical personnel in the field.

Figure 1:
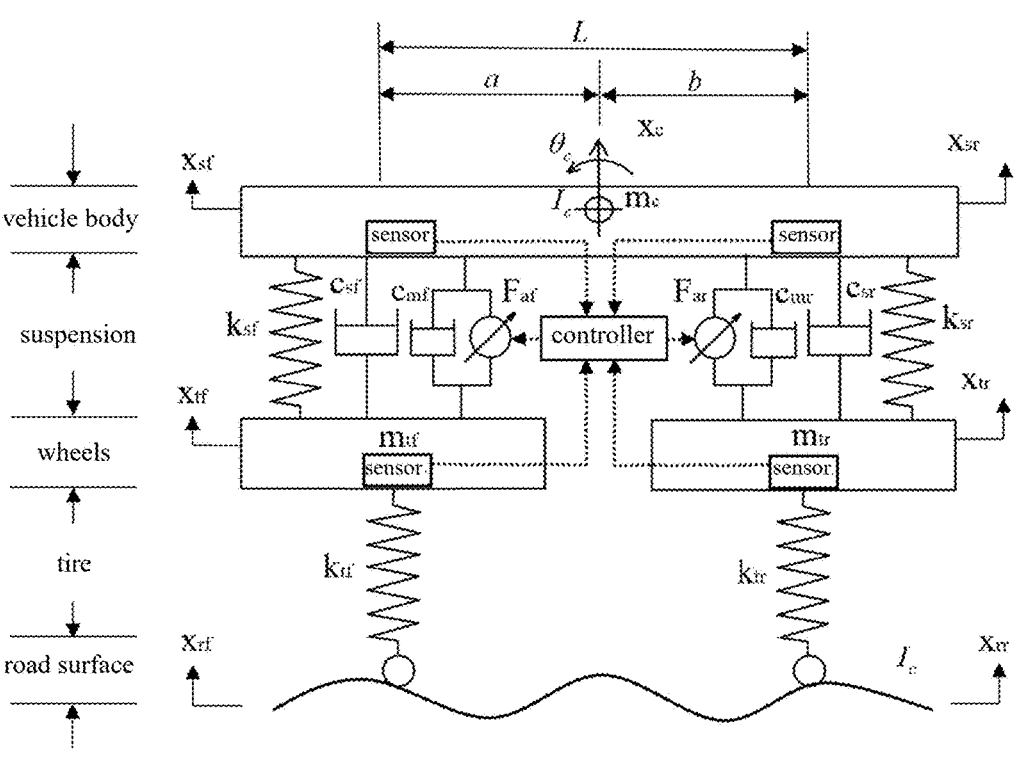
FIG. 1 is a dynamic model of a half-car four-degree-of-freedom active suspension system of the present disclosure.
Figure 2:
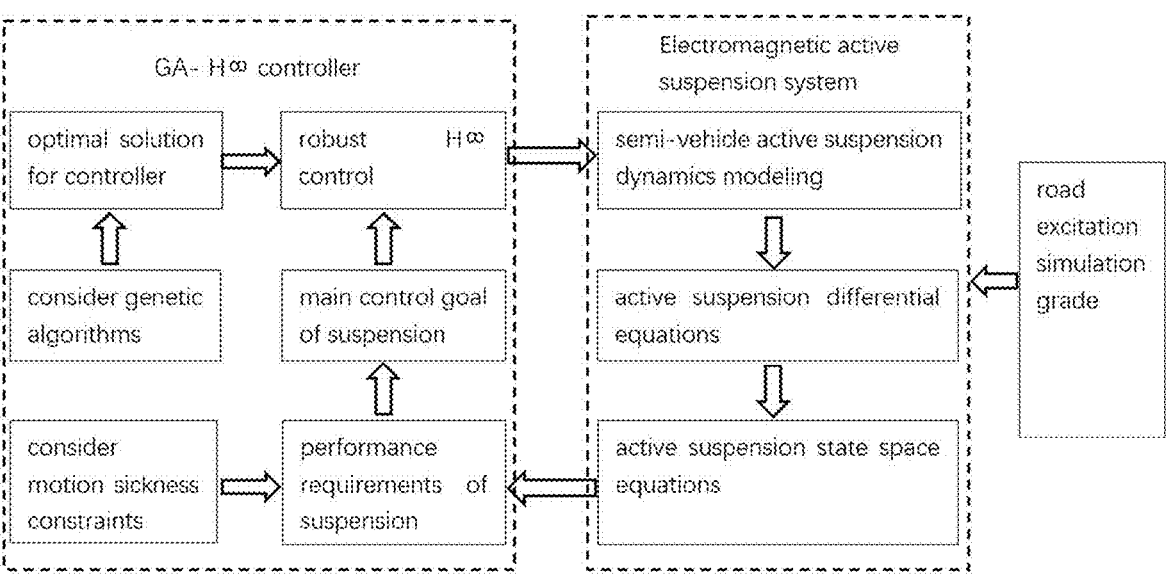
FIG. 2 is a technical roadmap of an anti-carsickness active suspension robust genetic control method of the present disclosure.
Figure 3:
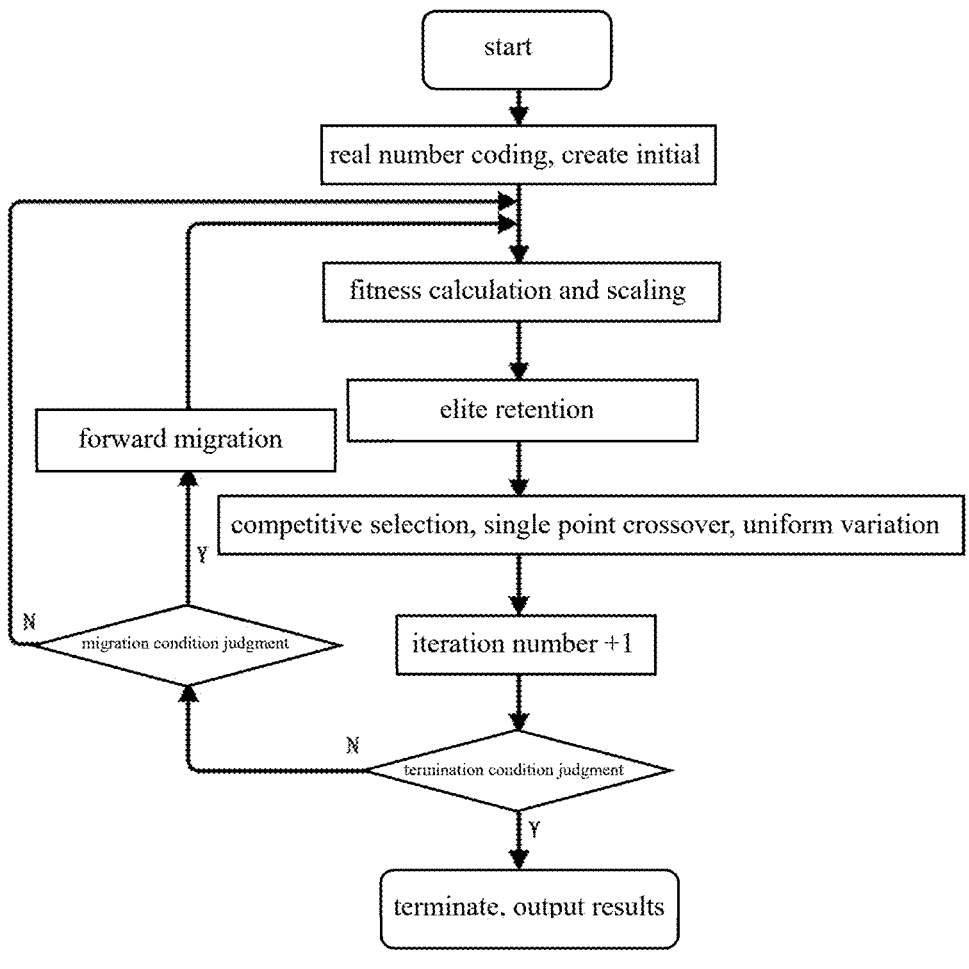
FIG. 3 is a flow chart of the genetic algorithm of the present disclosure.

With reference to FIGS. 1-3, the present disclosure discloses an anti-carsickness active suspension robust genetic control method, and the specific steps are as follows:

S1: Establishing a system state equation of a vehicle's four-degree-of-freedom active suspension according to dynamic characteristics of the vehicle.

The differential equation of motion for the system is as follows:

$$m_c\ddot{x}_c + c_{sf}(\dot{x}_{sf} - \dot{x}_{tf}) + k_{sf}(x_{sf} - x_{tf}) +$$
$$c_{sr}(\dot{x}_{sr} - \dot{x}_{tr}) + k_{sr}(x_{sr} - x_{tr}) + F_{af} + F_{ar} = 0$$

$$I_c\ddot{\theta}_c - ac_{sf}(\dot{x}_{sf} - \dot{x}_{tf}) - ak_{sf}(x_{sf} - x_{tf}) +$$
$$bc_{sr}(\dot{x}_{sr} - \dot{x}_{tr}) + bk_{sr}(x_{sr} - x_{tr}) - aF_{af} + bF_{ar} = 0$$

$$m_{tf}\ddot{x}_{tf} - c_{sf}(\dot{x}_{sf} - \dot{x}_{tf}) - k_{sf}(x_{sf} - x_{tf}) + k_{tf}(x_{tf} - x_{rf}) - F_{af} = 0$$

$$m_{tr}\ddot{x}_{tr} - c_{sr}(\dot{x}_{sr} - \dot{x}_{tr}) - k_{sr}(x_{sr} - x_{tr}) + k_{tr}(x_{tr} - x_{rr}) - F_{ar} = 0$$

Among them: $m_c$ is the over-sprung mass, $m_{tf}$ is the under-sprung mass of the front wheel, $m_{tr}$ is the under-sprung mass of the rear wheel, $I_c$ is the moment inertia of the body, $\theta_c$ is the pitch angle of the body, $x_c$ is the vertical displacement of the gravity center of the body, $x_{tf}$ is the vertical displacement of the front wheel, $x_{tr}$ is the vertical displacement of the rear wheel, $x_{rf}$ is the front wheel road input, $x_{rr}$ is the rear wheel road input, $c_{sf}$ is the front suspension damping, $c_{sr}$ is the rear suspension damping, $k_{sf}$ is the front suspension stiffness, $k_{sr}$ is the rear suspension stiffness, $k_{tf}$ is the front tire stiffness, $k_{tr}$ is the rear tire stiffness, $F_{af}$ is the front suspension actuator output force, $F_{ar}$ is the rear suspension actuator output force, $a$ is the front wheelbase, and $b$ is the rear wheelbase; $\dot{\Box}$ denotes the first-order derivative of the quantity, i.e., velocity, and $\ddot{\Box}$ denotes the second-order derivative of the quantity, i.e., acceleration.

The state vector is selected as:

$$X = [x_{sf}, x_{tf}, x_{sr}, x_{tr}, \dot{x}_{sf}, \dot{x}_{tf}, \dot{x}_{sr}, \dot{x}_{tr}]^T$$

The differential equation of motion of the active suspension system is converted into the system state equation:

$$\dot{X} = AX + BU + \Gamma W$$

Among them:

$$A = \begin{bmatrix} A_{11} & A_{12} \\ A_{21} & A_{22} \end{bmatrix}; B = \begin{bmatrix} B_1 \\ B_2 \end{bmatrix}; U = \begin{bmatrix} F_{af} \\ F_{ar} \end{bmatrix}; \Gamma = \begin{bmatrix} \Gamma_1 \\ \Gamma_2 \end{bmatrix}; W = \begin{bmatrix} x_{rf} \\ x_{rr} \end{bmatrix}$$

Let $k_1 = I_c + a^2 m_c$, $k_2 = I_c + b^2 m_c$, $k_3 = I_c - abm_c$, $k_4 = I_c m_c$, then:

$$A_{11} = \begin{bmatrix} 0 & 0 & 0 & 0 \\ 0 & 0 & 0 & 0 \\ 0 & 0 & 0 & 0 \\ 0 & 0 & 0 & 0 \end{bmatrix}; A_{12} = \begin{bmatrix} 1 & 0 & 0 & 0 \\ 0 & 1 & 0 & 0 \\ 0 & 0 & 1 & 0 \\ 0 & 0 & 0 & 1 \end{bmatrix};$$

$$A_{21} = \begin{bmatrix} -\frac{k_1}{k_4}k_{sf} & \frac{k_1}{k_4}k_{sf} & -\frac{k_3}{k_4}k_{sr} & \frac{k_3}{k_4}k_{sr} \\ \frac{k_{sf}}{m_{tf}} & -\frac{k_{sf}+k_{tf}}{m_{tf}} & 0 & 0 \\ -\frac{k_3}{k_4}k_{sf} & \frac{k_3}{k_4}k_{sf} & -\frac{k_2}{k_4}k_{sr} & \frac{k_2}{k_4}k_{sr} \\ 0 & 0 & \frac{k_{sr}}{m_{tr}} & -\frac{k_{sr}+k_{tr}}{m_{tr}} \end{bmatrix};$$

$$A_{22} = \begin{bmatrix} -\frac{k_1}{k_4}c_{sf} & \frac{k_1}{k_4}c_{sf} & -\frac{k_3}{k_4}c_{sr} & \frac{k_3}{k_4}c_{sr} \\ \frac{c_{sf}}{m_{tf}} & -\frac{c_{sf}}{m_{tf}} & 0 & 0 \\ -\frac{k_3}{k_4}c_{sf} & \frac{k_3}{k_4}c_{sf} & -\frac{k_2}{k_4}c_{sr} & \frac{k_2}{k_4}c_{sr} \\ 0 & 0 & \frac{c_{sr}}{m_{tr}} & -\frac{c_{sr}}{m_{tr}} \end{bmatrix}; B_1 = \begin{bmatrix} 0 & 0 & 0 & 0 \\ 0 & 0 & 0 & 0 \end{bmatrix}^T;$$

$$B_2 = \begin{bmatrix} -\frac{k_1}{k_4} & \frac{1}{m_{tf}} & -\frac{k_3}{k_4} & 0 \\ -\frac{k_3}{k_4} & 0 & -\frac{k_2}{k_4} & \frac{1}{m_{tf}} \end{bmatrix}^T;$$

$$\Gamma = \begin{bmatrix} 0 & 0 & 0 & 0 \\ 0 & 0 & 0 & 0 \end{bmatrix}^T; \Gamma = \begin{bmatrix} 0 & \frac{k_{tf}}{m_{tf}} & 0 & 0 \\ 0 & 0 & 0 & \frac{k_{tr}}{m_{tr}} \end{bmatrix}^T.$$

S2: Establishing basic performance constraints of the suspension and an optimization objective function for anti-carsickness, so as to obtain a control state equation.

S2.1: Establishing the basic performance constraints of the suspension, that is, satisfying the following conditions:

1) a travel of the suspension should not exceed a maximum allowable travel, that is, $|x_t - x_s| < x_{stmax}$; among them, $x_t$ represents the vertical displacement of the tire, $x_s$ represents the vertical displacement of the vehicle body, and $x_{stmax}$ represents the maximum allowable travel of the suspension;

2) the wheels maintain good contact with the ground, that is, $|k_t(x_r - x_t)| < |(m_c + m_t)g|$; among them, $k_t$ represents tire stiffness, $x_r$ represents vertical displacement of the road surface, $m_t$ represents tire mass, and $g$ represents gravity acceleration;

3) a control force should be less than a maximum output control force of the actuator, that is, $F_a < F_{max}$; among them, $F_a$ represents the actuator output force, and $F_{max}$ represents the maximum output force of the actuator. A control output of a selectable system is:

$$Z_2 = \left[ \frac{x_t - x_s}{x_{st\ max}} \quad \frac{k_t(x_r - x_t)}{(m_c + m_t)g} \quad \frac{F_a}{F_{max}} \right]^T;$$

S2.2 Establishing an optimization objective function for anti-carsickness:

$$\sup_{0.1 < \omega < 0.5} \left\| G_{\omega z_1}(j\omega) \right\|_\infty < \gamma.$$

Establishing the best suspension suppression capability for road excitation within the motion sickness frequency range, which can effectively alleviate occupants' motion sickness, and improve ride comfort and vehicle driving smoothness. The road disturbance input is an energy-bounded signal. The control goal of this control method is to improve the ride comfort and reduce the vehicle acceleration and the vehicle pitch angle acceleration. Therefore, an observation output of the selectable system is $Z_1 = [\ddot{x}_{sf} \ \ddot{\theta}_c \ \ddot{x}_{sr}]^T$, which can be achieved by reducing the maximum value of the transfer function from the road disturbance to the vehicle acceleration. The mathematical description of the control goal is $$\sup_{0.1 < \omega < 0.5} \left\| G_{\omega z_1}(j\omega) \right\|_\infty < \gamma.$$

S3: During vehicle driving, establishing an active suspension robust control state equation having a wheelbase preview according to road information collected by front wheels and constraints like motion sickness index.

Since the wheelbase L of the vehicle is a constant, there is a time lag between the front wheel excitation and the rear wheel excitation of the four-degree-of-freedom suspension model, that is $$t_\tau = \frac{L}{v_c},$$

where $t_\tau$ represents the excitation input time lag, and $v_c$ represents the vehicle speed. Therefore, the control state equation is:

$$\dot{X} = AX + BU + \Gamma W$$

10

-continued $$Z_1 = C_1 X + D_1 U$$

$$Z_2 = C_2 X + D_2 U$$

Among them, $C_1$ and $D_1$ are the coefficient matrices of the observation output, and $C_2$ and $D_2$ are the coefficient matrices of the control output.

S4: Based on the state equation obtained in S3, designing a finite frequency domain H∞ control algorithm for controlling an input delay, and establishing a linear matrix inequality for a system stability.

For given positive numbers $\gamma$, $\alpha$, $\beta_1$, $\beta_2$, $\rho$, if there exist symmetric matrices $P > 0$, $P_1 > 0$, $P_2 > 0$, $S_1 > 0$, $S_2 > 0$, $R_1 > 0$, $R_2 > 0$, $Q > 0$, and arbitrary matrices K and Y satisfy the inequality:

$$\begin{bmatrix} t_\tau^2 S_1 - [Y]_s & P_1 + AY^T - \alpha Y & BK \\ * & R_1 - S_1 + \alpha[AY^T]_s & S_1 + \alpha BK \\ * & * & -R_1 - S_1 \end{bmatrix} < 0$$

$$\begin{bmatrix} \prod_1 & \prod_2 & \beta_1 BK & \beta_1 D & O \\ * & \prod_3 & \beta_2 BK & \beta_2 D & YC_1^T \\ * & * & -R_2 - S_2 & O & K^T D_1^T \\ * & * & * & -\gamma^2 I & 0 \\ * & * & * & * & -I \end{bmatrix} < 0$$

$$\begin{bmatrix} -I/\rho & \{C_2 + D_2 K\}_i \\ * & -P_2 \end{bmatrix} < 0$$

wherein, the symbol $[\square]_s$ is the sum of a matrix "$\square$" and its transposed matrix; * is the transpose of its diagonal symmetric elements; $\{\square\}_i$ represents the i-th row of the matrix "$\square$";

$$\prod_1 = t_\tau^2 S_2 - Q - \beta_1[Y];$$

$$\prod_2 = P + P_2 + j\omega_c Q + \beta_1 AY^T - \beta_2 Y;$$

$$\prod_3 = R_2 - S_2 - \omega_1 \omega_2 Q + \beta_2[AY^T]_s.$$

S5: Introducing a genetic algorithm to find an optimal solution for parameters in the linear matrix inequality, and improving the control algorithm is by the genetic algorithm to find an optimal solution of a controller.

S5.1: Encoding chromosome and generating population. Chromosome coding is real number coding with control parameters as adjustable variables for chromosomes, which can be expressed as Ch=($\alpha$, $\beta_1$, $\beta_2$). Feasible population is adopted in the creation of the initial trial population, and a random initial population can be created while satisfying boundary conditions and constraints, thereby ensuring the diversity of the initial population and the global search of the algorithm.

S5.2: Selecting a fitness function and scaling a fitness value. An optimization goal of the controller is to find the control parameter value that makes $\gamma$ have the minimum value, so as to minimize the H∞ norm of the transfer function from road disturbance to vehicle acceleration, especially to minimize the influence within the frequency range where human body is prone to motion sickness. In the GA toolbox in MATLAB, the fitness function uses the minimization objective function, and the fitness function can be directly taken as Fitness=γ(Ch).

S5.3: Introducing selection, crossover, mutation and migration operators. The selection operator means randomly selecting n chromosomes according to the fitness value, and the best individuals among the n chromosomes being used as parents to generate individuals of the next generation. The crossover operator means selecting a pair of individuals from the parent individuals, generating new individuals through crossover operation, and mixing the chromosome information of the two individuals. The mutation operator means performing mutation operation on the newly generated individuals and introducing randomness, so as to increase the diversity of the search space. The migration operator is an advanced genetic operator that supports the exchange of individuals in multiple sub-populations, the worst individual in a sub-population is replaced by the best individual in another sub-population. Compared with the single-population genetic algorithm, the genetic algorithm for individual migration in multiple sub-populations can improve the optimization performance of the algorithm. Migration can only be from the n-generation sub-population to the (n+1)-generation sub-population. The migration rate is 0.1 and the migration interval is 10, that is, migration once every 10 generations.

S5.4: Judging a termination condition. A number of iterations is adopted in the termination criterion of the genetic algorithm, that is, when the maximum number of iterations is reached or the objective function reaches a certain threshold, it is judged whether the algorithm stops.

S6: Based on the optimal solution obtained in S5, obtaining a closed-loop control system that satisfies the constraints of the suspension and the optimization objective function for anti-carsickness, so as to obtain a feedback gain of an output state, and further obtain the controller of the active suspension.

Taking the suspension time-delay system as the research object, the design process of the finite frequency domain H∞ controller for controlling input time delay can be obtained as follows:

(1) The system gradually stabilizes when there is no external interference;

(2) Under zero initial conditions, the transfer function from external disturbance to output should satisfy the following conditions within the passenger motion sickness frequency range (0.1-0.5 Hz):

$$\sup_{0.1<\omega<0.5}\left\|G_{\omega z_1}(j\omega)\right\|_\infty < \gamma;$$

(3) When the external disturbance energy is less than $\omega_{max}=\sqrt{\rho}/\gamma$, the control constraints can always be guaranteed.

After the main control parameters α, β1, β2 are obtained through genetic algorithm optimization, the linear matrix inequality is solved, and then the feedback gain of the controller is obtained through state feedback control, and then the control force of the actuator is obtained.

According to the collected road information and the driving status of the vehicle, the finite frequency domain division control is performed to make the frequencies of the vehicle's vertical vibration and pitch vibration avoid the sensitive frequency range where the human body is prone to motion sickness. In order to achieve the best control effect, the genetic algorithm is also considered to optimize the parameters of the linear matrix inequality to obtain the optimal control parameters. Thus, the passengers are prevented from motion sickness while ensuring safety and efficiency, and the basic performance requirements of the suspension are guaranteed.

It should be noted that the present disclosure is not limited to the exact technical solutions that has been described above and shown in the drawings, and that various modifications and changes may be made without departing from the scope thereof.

What is claimed is:

1. An anti-carsickness active suspension robust genetic control method comprises the following steps:

S1: Establishing a system state equation of a vehicle's four-degree-of-freedom active suspension according to dynamic characteristics of the vehicle;

S2: Establishing basic performance constraints of the suspension and an optimization objective function for anti-carsickness, so as to obtain a control state equation;

S3: During vehicle driving, establishing an active suspension robust control state equation having a wheelbase preview according to road information collected by front wheels and constraints like motion sickness index;

S4: Based on the state equation obtained in S3, designing a finite frequency domain H∞ control algorithm for controlling an input delay, and establishing a linear matrix inequality for a system stability;

S5: Introducing a genetic algorithm to find an optimal solution for parameters in the linear matrix inequality, and improving the control algorithm is by the genetic algorithm to find an optimal solution of a controller;

S6: Based on the optimal solution obtained in S5, obtaining a closed-loop control system that satisfies the constraints of the suspension and the optimization objective function for anti-carsickness, so as to obtain a feedback gain of an output state, and further obtain the controller of the active suspension.

2. The control method according to claim 1, wherein in the step S1:

a differential equation of motion for the system is as follows:

$$m_c\ddot{x}_c + c_{sf}(\dot{x}_{sf} - \dot{x}_{tf}) + k_{sf}(x_{sf} - x_{tf}) +$$
$$c_{sr}(\dot{x}_{sr} - \dot{x}_{tr}) + k_{sr}(x_{sr} - x_{tr}) + F_{af} + F_{ar} = 0$$

$$I_c\ddot{\theta}_c - ac_{sf}(\dot{x}_{sf} - \dot{x}_{tf}) - ak_{sf}(x_{sf} - x_{tf}) +$$
$$bc_{sr}(\dot{x}_{sr} - \dot{x}_{tr}) + bk_{sr}(x_{sr} - x_{tr}) - aF_{af} + bF_{ar} = 0$$

$$m_{tf}\ddot{x}_{tf} - c_{sf}(\dot{x}_{sf} - \dot{x}_{tf}) - k_{sf}(x_{sf} - x_{tf}) + k_{tf}(x_{tf} - x_{rf}) - F_{af} = 0$$

$$m_{tr}\ddot{x}_{tr} - c_{sr}(\dot{x}_{sr} - \dot{x}_{tr}) - k_{sr}(x_{sr} - x_{tr}) + k_{tr}(x_{tr} - x_{rr}) - F_{ar} = 0$$

among them: mc is an over-sprung mass, mtf is a under-sprung mass of the front wheel, mtr is a under-sprung mass of the rear wheel, Ic is a moment inertia of the body, θc is a pitch angle of the body, xc is a vertical displacement of a gravity center of the body, xtf is a vertical displacement of the front wheel, xtr is a vertical displacement of the rear wheel, xrf is a front wheel road input, xrr is a rear wheel road input, csf is a front suspension damping, csr is a rear suspension damping, ksf is a front suspension stiffness, ksr is a rear suspension stiffness, ktf is a front tire stiffness, ktr is a rear tire stiffness, Faf is a front suspension actuator output force, Far is a rear suspension actuator output force, a is a front wheelbase, and b is a rear wheelbase; $\dot{\Box}$ denotes a first-order derivative of the quantity, i.e., velocity, and $\ddot{\Box}$ denotes a second-order derivative of the quantity, i.e., acceleration;

the state vector is selected as: $X=[x_{sf}, x_{tf}, x_{sr}, x_{tr}, \dot{x}_{sf}, \dot{x}_{tf}, \dot{x}_{sr}, \dot{x}_{tr}]^T$ the differential equation of motion of the active suspension system is converted into the system state equation: $\dot{X}=AX+BU+\Gamma W$, among them:

$$A = \begin{bmatrix} A_{11} & A_{12} \\ A_{21} & A_{22} \end{bmatrix}; B = \begin{bmatrix} B_1 \\ B_2 \end{bmatrix}; U = \begin{bmatrix} F_{af} \\ F_{ar} \end{bmatrix}; \Gamma = \begin{bmatrix} \Gamma_1 \\ \Gamma_2 \end{bmatrix}; W = \begin{bmatrix} x_{rf} \\ x_{rr} \end{bmatrix}$$

let $k_1=I_c+a^2m_c$, $k_2=I_c+b^2m_c$, $k_3=I_c-abm_c$, $k_4=I_cm_c$, then:

$$A_{11} = \begin{bmatrix} 0 & 0 & 0 & 0 \\ 0 & 0 & 0 & 0 \\ 0 & 0 & 0 & 0 \\ 0 & 0 & 0 & 0 \end{bmatrix}; A_{12} = \begin{bmatrix} 1 & 0 & 0 & 0 \\ 0 & 1 & 0 & 0 \\ 0 & 0 & 1 & 0 \\ 0 & 0 & 0 & 1 \end{bmatrix};$$

$$A_{21} = \begin{bmatrix} -\dfrac{k_1}{k_4}k_{sf} & \dfrac{k_1}{k_4}k_{sf} & -\dfrac{k_3}{k_4}k_{sr} & \dfrac{k_3}{k_4}k_{sr} \\ \dfrac{k_{sf}}{m_{tf}} & -\dfrac{k_{sf}+k_{tf}}{m_{tf}} & 0 & 0 \\ -\dfrac{k_3}{k_4}k_{sf} & \dfrac{k_3}{k_4}k_{sf} & -\dfrac{k_2}{k_4}k_{sr} & \dfrac{k_2}{k_4}k_{sr} \\ 0 & 0 & \dfrac{k_{sr}}{m_{tr}} & -\dfrac{k_{sr}+k_{tr}}{m_{tr}} \end{bmatrix};$$

$$A_{22} = \begin{bmatrix} -\dfrac{k_1}{k_4}c_{sf} & \dfrac{k_1}{k_4}c_{sf} & -\dfrac{k_3}{k_4}c_{sr} & \dfrac{k_3}{k_4}c_{sr} \\ \dfrac{c_{sf}}{m_{tf}} & -\dfrac{c_{sf}}{m_{tf}} & 0 & 0 \\ -\dfrac{k_3}{k_4}c_{sf} & \dfrac{k_3}{k_4}c_{sf} & -\dfrac{k_2}{k_4}c_{sr} & \dfrac{k_2}{k_4}c_{sr} \\ 0 & 0 & \dfrac{c_{sr}}{m_{tr}} & -\dfrac{c_{sr}}{m_{tr}} \end{bmatrix}; B_1 = \begin{bmatrix} 0 & 0 & 0 & 0 \\ 0 & 0 & 0 & 0 \end{bmatrix}^T;$$

$$B_2 = \begin{bmatrix} -\dfrac{k_1}{k_4} & \dfrac{1}{m_{tf}} & -\dfrac{k_3}{k_4} & 0 \\ -\dfrac{k_3}{k_4} & 0 & -\dfrac{k_2}{k_4} & \dfrac{1}{m_{tf}} \end{bmatrix};$$

$$\Gamma_1 = \begin{bmatrix} 0 & 0 & 0 & 0 \\ 0 & 0 & 0 & 0 \end{bmatrix}^T; \Gamma_2 = \begin{bmatrix} 0 & \dfrac{k_{tf}}{m_{tf}} & 0 & 0 \\ 0 & 0 & 0 & \dfrac{k_{tr}}{m_{tr}} \end{bmatrix}^T.$$

3. The control method according to claim 1, wherein the step S2 comprises steps of:

S2.1 establishing the basic performance constraints of the suspension, that is, satisfying the following conditions:

1) a travel of the suspension not exceeding a maximum allowable travel, that is, $|x_t-x_s|<x_{stmax}$; among them, $x_t$ represents a vertical displacement of the tire, $x_s$ represents a vertical displacement of the vehicle body, and $x_{stmax}$ represents a maximum allowable travel of the suspension;

2) the wheels maintaining good contact with the ground, that is, $|k_t(x_r-x_t)|<|(m_c+m_t)g|$; among them, $k_t$ represents a tire stiffness, $x_r$ represents a vertical displacement of the road surface, $m_t$ represents a tire mass, and g represents a gravity acceleration;

3) a control force being less than a maximum output control force of the actuator, that is, $F_a<F_{max}$; among them, $F_a$ represents a actuator output force, and $F_{max}$ represents a maximum output force of the actuator; a control output of a selectable system is:

$$Z_2 = \begin{bmatrix} \dfrac{x_t-x_s}{x_{st\,max}} & \dfrac{k_t(x_r-x_t)}{(m_c+m_t)g} & \dfrac{F_a}{F_{max}} \end{bmatrix}^T;$$

S2.2 establishing an optimization objective function for anti-carsickness, including: establishing a best suspension suppression capability for a road excitation within a motion sickness frequency range; a road disturbance input being an energy-bounded signal; an observation output of the selectable system being $Z_1=[\ddot{x}_{sf}, \ddot{\theta}_c, \ddot{x}_{sr}]^T$, which can be achieved by reducing the maximum value of the transfer function from the road disturbance to the vehicle acceleration; a mathematical description of the control goal being $$\sup_{0.1<\omega<0.5} \left\| G_{\omega z_1}(j\omega) \right\|_\infty < \gamma.$$

4. The control method according to claim 1, wherein in the step of S3: since the wheelbase L of the vehicle is a constant, there is a time lag between the front wheel excitation and the rear wheel excitation of the four-degree-of-freedom suspension model, that is $$t_\tau = \frac{L}{v_c},$$

where $t_\tau$ represents the excitation input time lag, and $v_c$ represents the vehicle speed; the control state equation is:

$$\dot{X} = AX + BU + \Gamma W$$
$$Z_1 = C_1 X + D_1 U$$
$$Z_2 = C_2 X + D_2 U$$

among them, $C_1$ and $D_1$ are the coefficient matrices of the observation output, and $C_2$ and $D_2$ are the coefficient matrices of the control output.

5. The control method according to claim 1, wherein in the step of S4:

for given positive numbers $\gamma$, $\alpha$, $\beta_1$, $\beta_2$, $\rho$, if there exist symmetric matrices $P>0$, $P_1>0$, $P_2>0$, $S_1>0$, $S_2>0$, $R_1>0$, $R_2>0$, $Q>0$, and arbitrary matrices K and Y satisfy the inequality:

$$\begin{bmatrix} t_\tau^2 S_1 - [Y]_s & P_1 + AY^T - \alpha Y & BK \\ * & R_1 - S_1 + \alpha[AY^T]_s & S_1 + \alpha BK \\ * & * & -R_1 - S_1 \end{bmatrix} < 0$$

-continued $$
\begin{bmatrix}
\left[\prod_1\right]_s & \prod_2 & \beta_1 BK & \beta_1 D & O \\
* & \left[\prod_3\right]_s & \beta_2 BK & \beta_2 D & YC_1^T \\
* & * & -R_2 - S_2 & O & K^T D_1^T \\
* & * & * & -\gamma^2 I & 0 \\
* & * & * & * & -I
\end{bmatrix} < 0
$$

$$
\begin{bmatrix}
-I/\rho & \{C_2 + D_2 K\}_i \\
* & -P_2
\end{bmatrix} < 0
$$

wherein, the symbol $[\square]_s$ is the sum of a matrix "$\square$" and its transposed matrix;

\* is the transpose of its diagonal symmetric elements; $\{\square\}_i$ represents the i-th row of the matrix "$\square$";

$$
\prod_1 = t_\tau^2 S_2 - Q - \beta_1 [Y];
$$

$$
\prod_2 = P + P_2 + j\omega_c Q + \beta_1 AY^T - \beta_2 Y;
$$

$$
\prod_3 = R_2 - S_2 - \omega_1 \omega_2 Q + \beta_2 \left[AY^T\right]_s.
$$

6. The control method according to claim 1, wherein the step S5 comprises steps of:

S5.1 encoding chromosome and generating population, that is: chromosome coding is real number coding with control parameters as adjustable variables for chromosomes, which can be expressed as Ch=($\alpha$, $\beta1$, $\beta2$); feasible population is adopted in the creation of the initial trial population, and a random initial population can be created while satisfying boundary conditions and constraints;

S5.2 selecting a fitness function and scaling a fitness value, that is: an optimization goal of the controller is to find the control parameter value that makes $\gamma$ have the minimum value, so as to minimize the H∞ norm of the transfer function from road disturbance to vehicle acceleration, especially to minimize the influence within the frequency range where human body is prone to motion sickness; in the GA toolbox in MATLAB, the fitness function uses the minimization objective function, and the fitness function can be directly taken as Fitness=$\gamma$(Ch);

S5.3 introducing selection, crossover, mutation and migration operators, that is: the selection operator means randomly selecting n chromosomes according to the fitness value, and the best individuals among the n chromosomes being used as parents to generate individuals of the next generation; the crossover operator means selecting a pair of individuals from the parent individuals, generating new individuals through crossover operation, and mixing the chromosome information of the two individuals; the mutation operator means performing mutation operation on the newly generated individuals and introducing randomness, so as to increase the diversity of the search space; the migration operator is an advanced genetic operator that supports the exchange of individuals in multiple subpopulations, the worst individual in a sub-population is replaced by the best individual in another sub-population, compared with the single-population genetic algorithm, the genetic algorithm for individual migration in multiple sub-populations can improve the optimization performance of the algorithm, migration can only be from the n-generation sub-population to the (n+1)-generation sub-population; the migration rate is 0.1 and the migration interval is 10, that is, migration once every 10 generations;

S5.4 judging a termination condition, that is: a number of iterations is adopted in the termination criterion of the genetic algorithm, that is, when the maximum number of iterations is reached or the objective function reaches a certain threshold, it is judged whether the algorithm stops.

7. The control method according to claim 1, wherein in the step S6:

taking the suspension time-delay system as the research object, the design process of the finite frequency domain H∞ controller for controlling input time delay can be obtained as follows:

(1) the system gradually stabilizes when there is no external interference;

(2) under zero initial conditions, the transfer function from external disturbance to output should satisfy the following conditions within the passenger motion sickness frequency range (0.1-0.5 Hz):

$$
\sup_{0.1 < \omega < 0.5} \left\| G_{\omega z_1}(j\omega) \right\|_\infty < \gamma;
$$

(3) when the external disturbance energy is less than $\omega_{max} = \sqrt{\rho}/\gamma$, the control constraints can always be guaranteed;

after the main control parameters $\alpha$, $\beta1$, $\beta2$ are obtained through genetic algorithm optimization, the linear matrix inequality is solved, and then the feedback gain of the controller is obtained through state feedback control, and then the control force of the actuator is obtained.

\* \* \* \* \*